Figure 15:
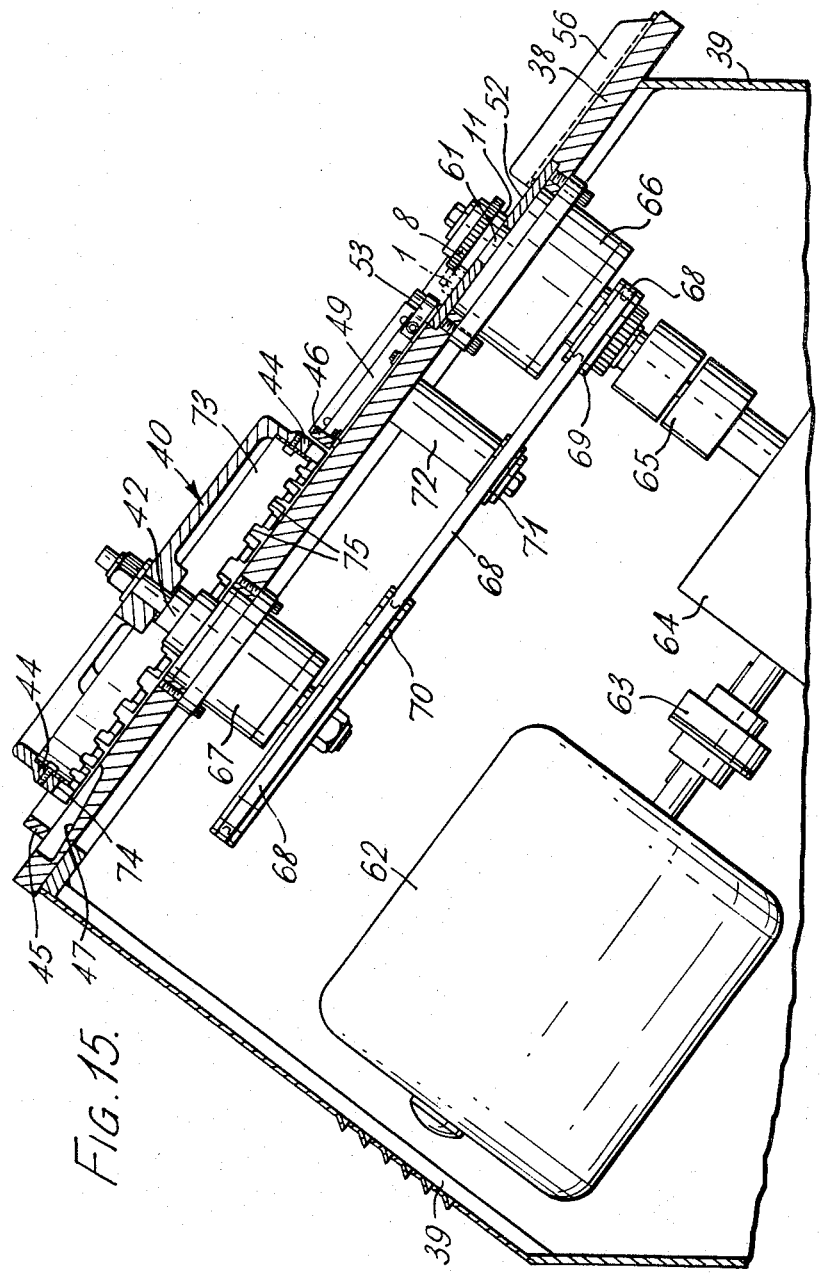

Nov. 28, 1967  J. L. MATTICK  3,354,926
SELF-LOCKING NUT AND METHOD OF MANUFACTURING THE SAME
Filed Jan. 8, 1964  12 Sheets-Sheet 1
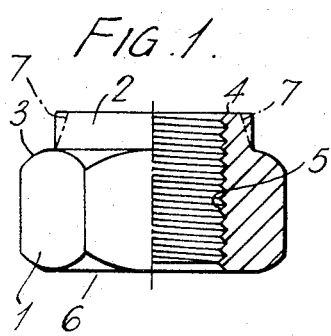
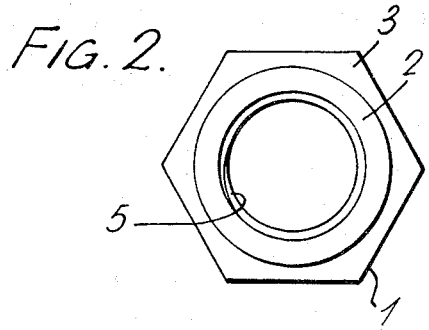
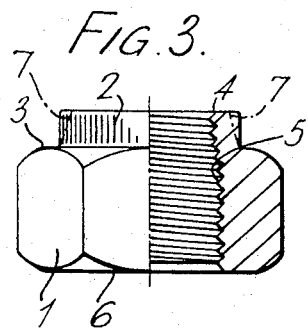
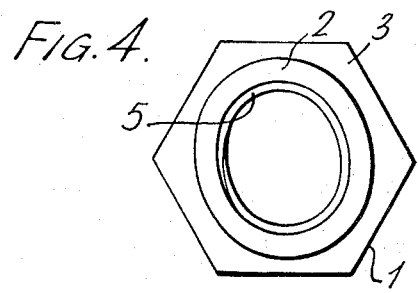
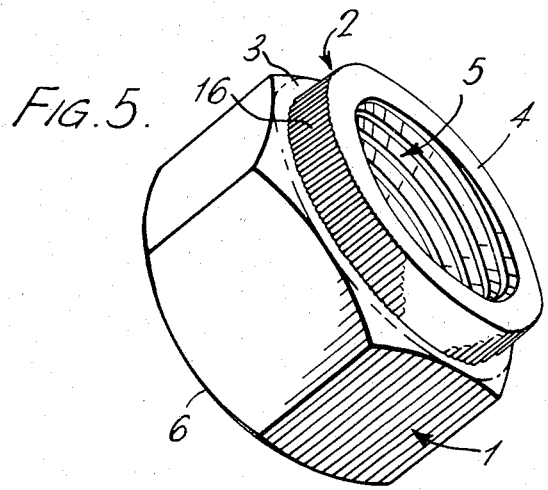
INVENTOR
JAMES LEONARD MATTICK
BY
ATTORNEYS

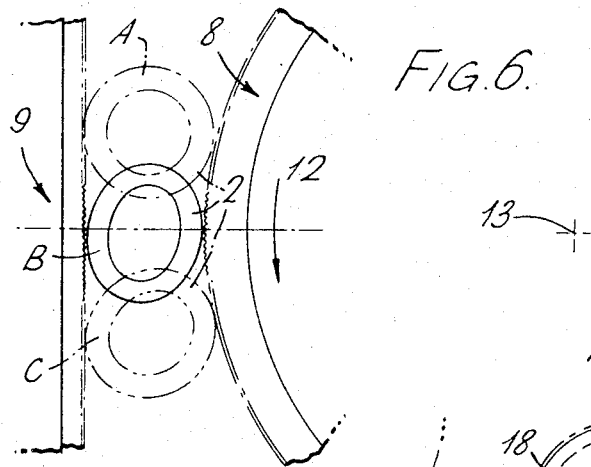
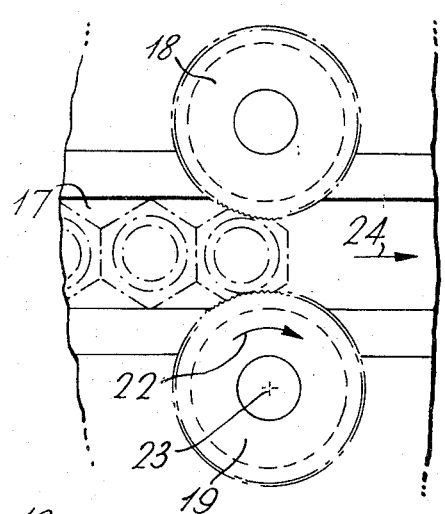
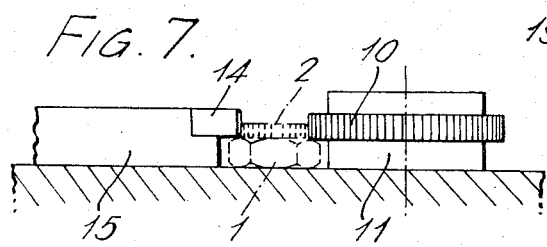
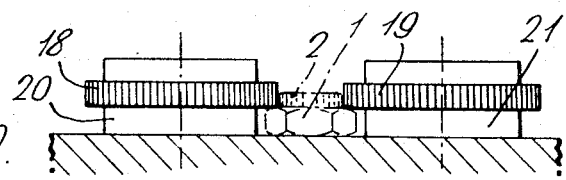

Nov. 28, 1967   J. L. MATTICK   3,354,926
SELF-LOCKING NUT AND METHOD OF MANUFACTURING THE SAME
Filed Jan. 8, 1964   12 Sheets-Sheet 3
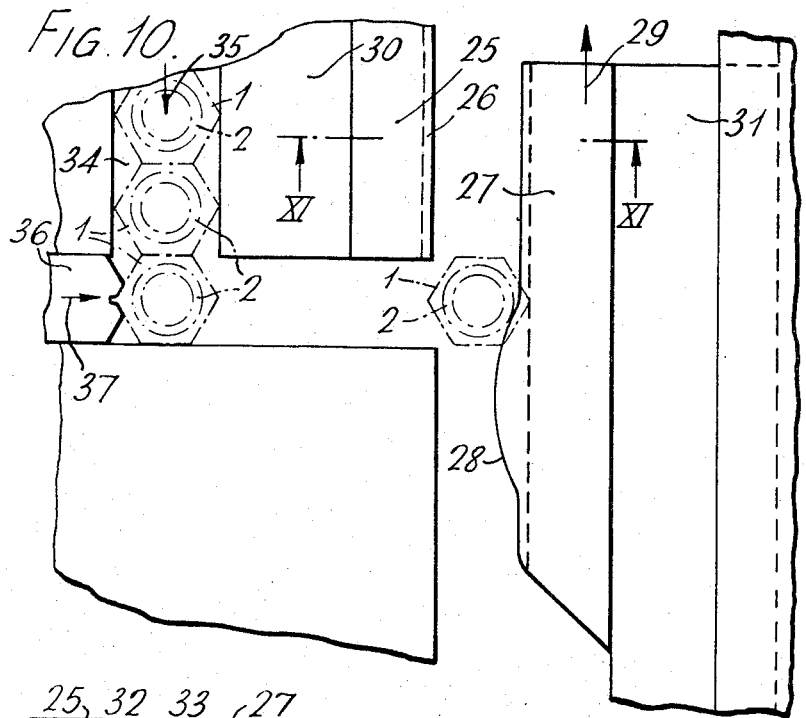
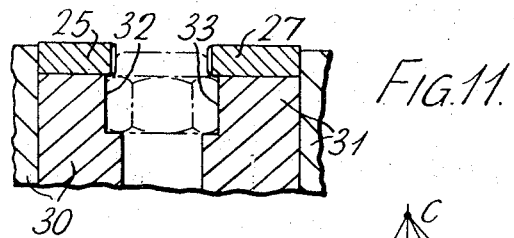
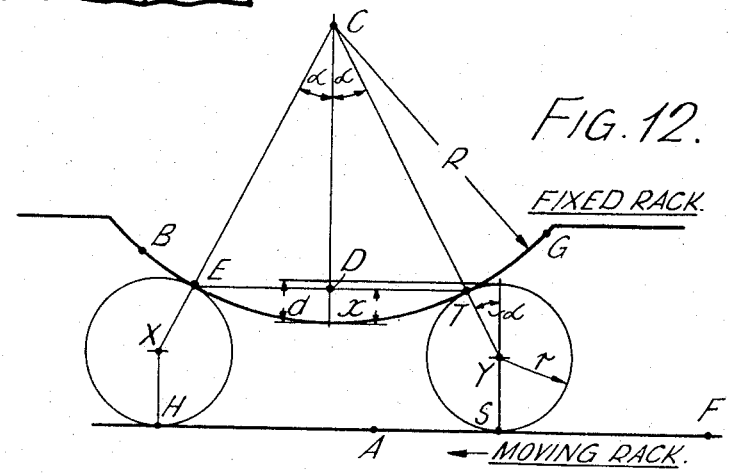
INVENTOR
JAMES LEONARD MATTICK
BY
ATTORNEYS Nov. 28, 1967  J. L. MATTICK  3,354,926
SELF-LOCKING NUT AND METHOD OF MANUFACTURING THE SAME
Filed Jan. 8, 1964  12 Sheets-Sheet 4
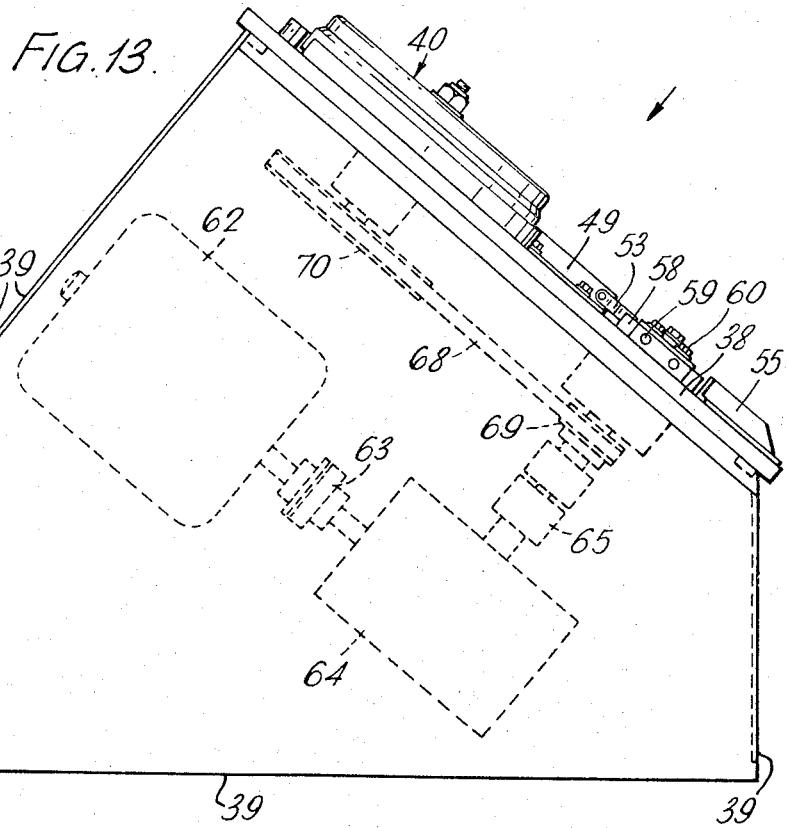
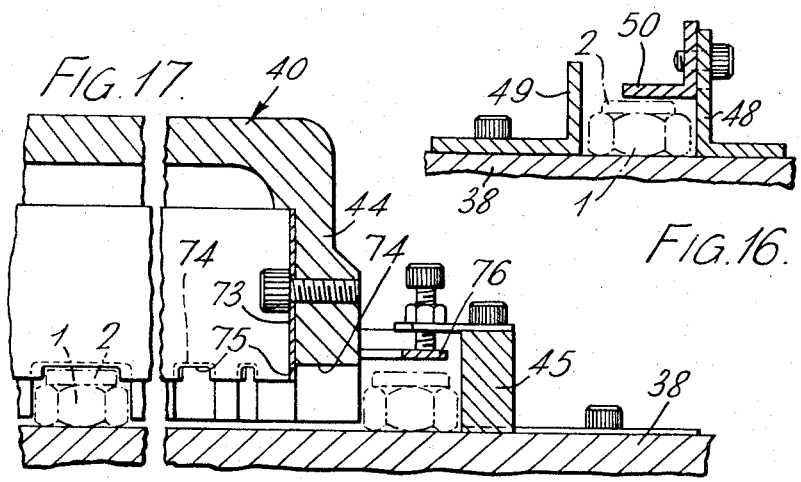
INVENTOR
JAMES LEONARD MATTICK
ATTORNEYS

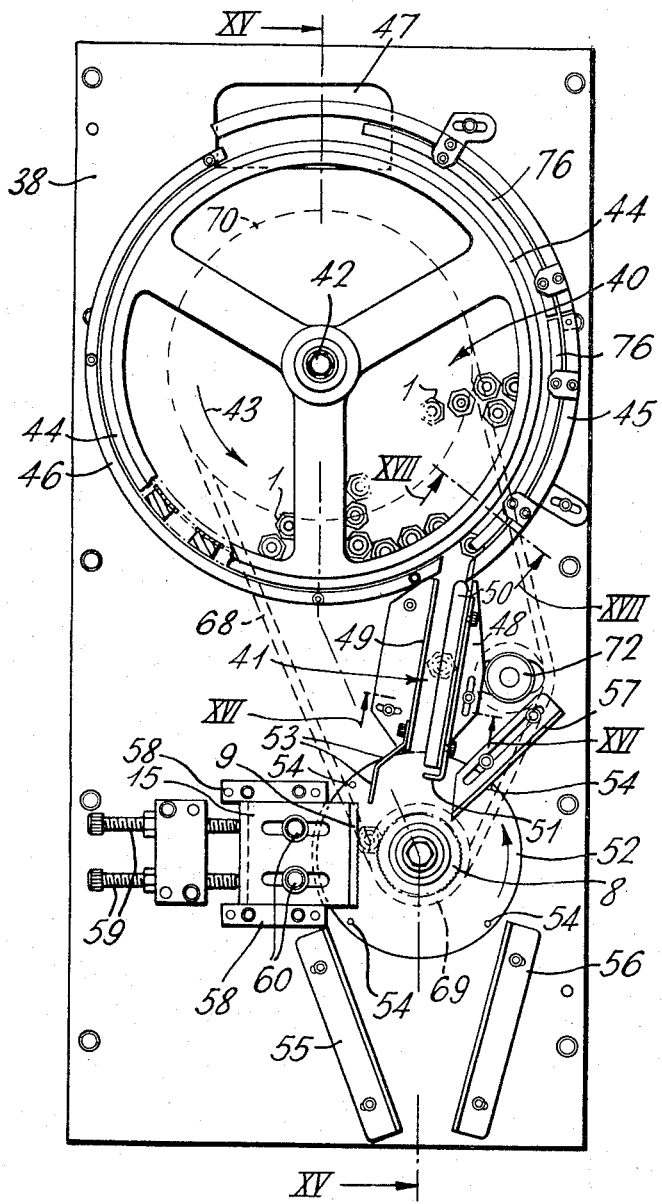

Nov. 28, 1967  J. L. MATTICK  3,354,926
SELF-LOCKING NUT AND METHOD OF MANUFACTURING THE SAME
Filed Jan. 8, 1964  12 Sheets-Sheet 6

INVENTOR
JAMES LEONARD MATTICK
BY
ATTORNEYS

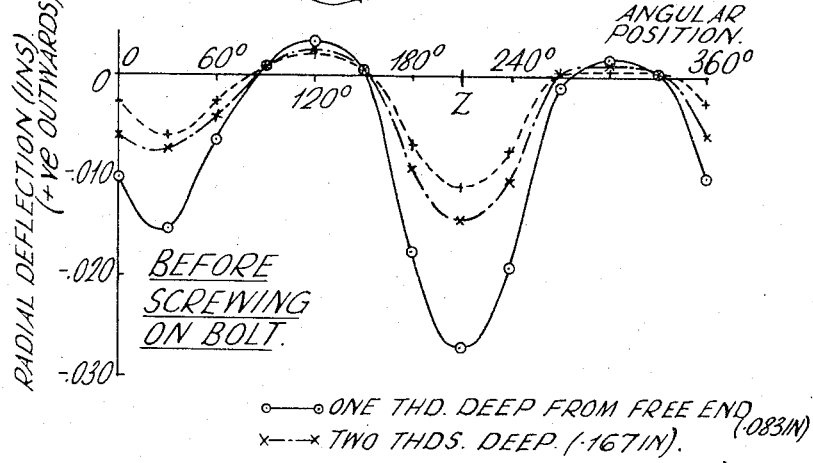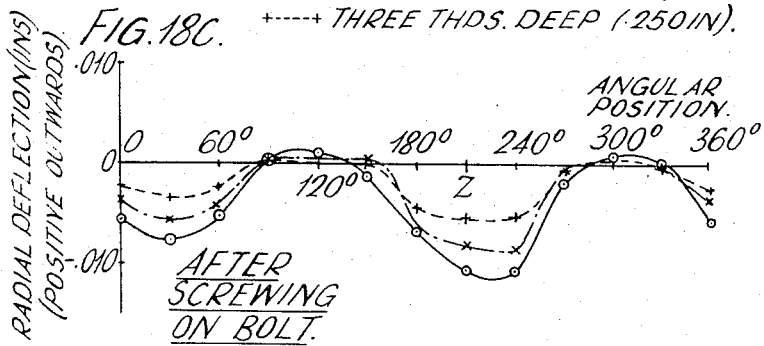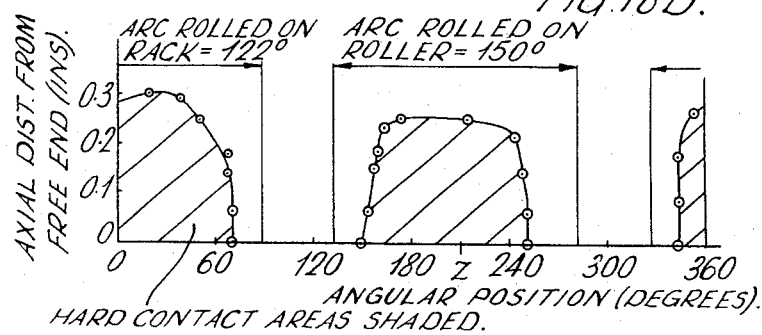

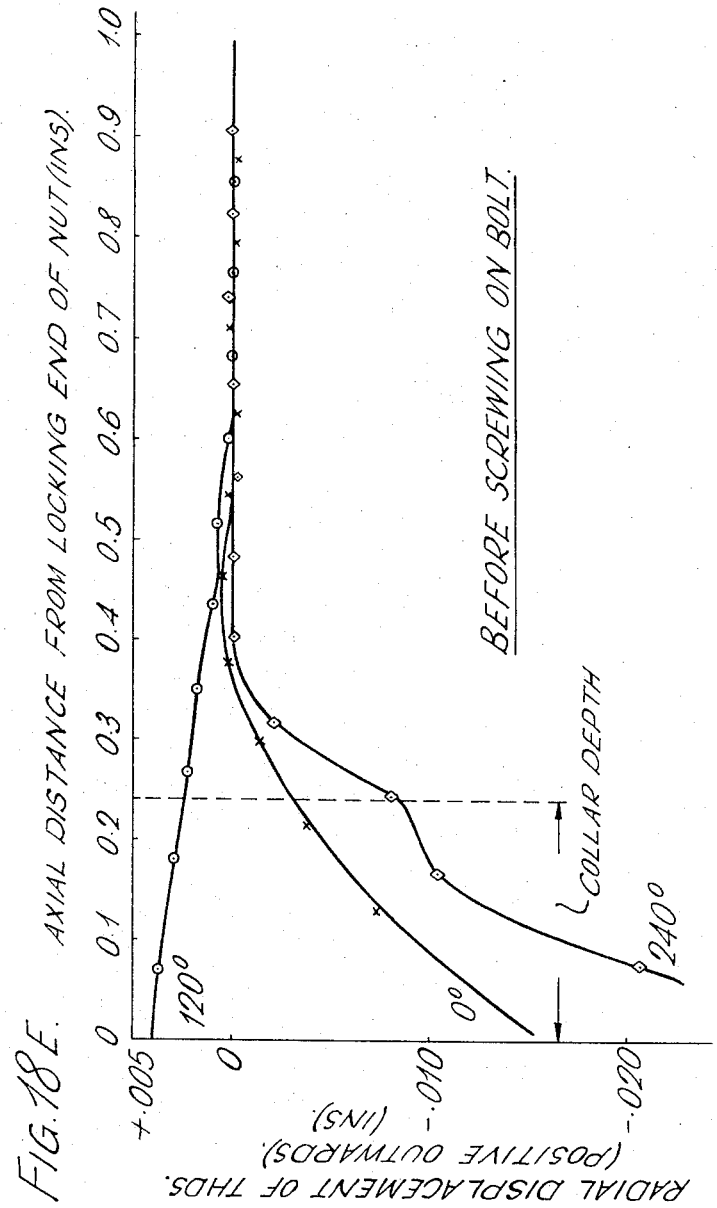

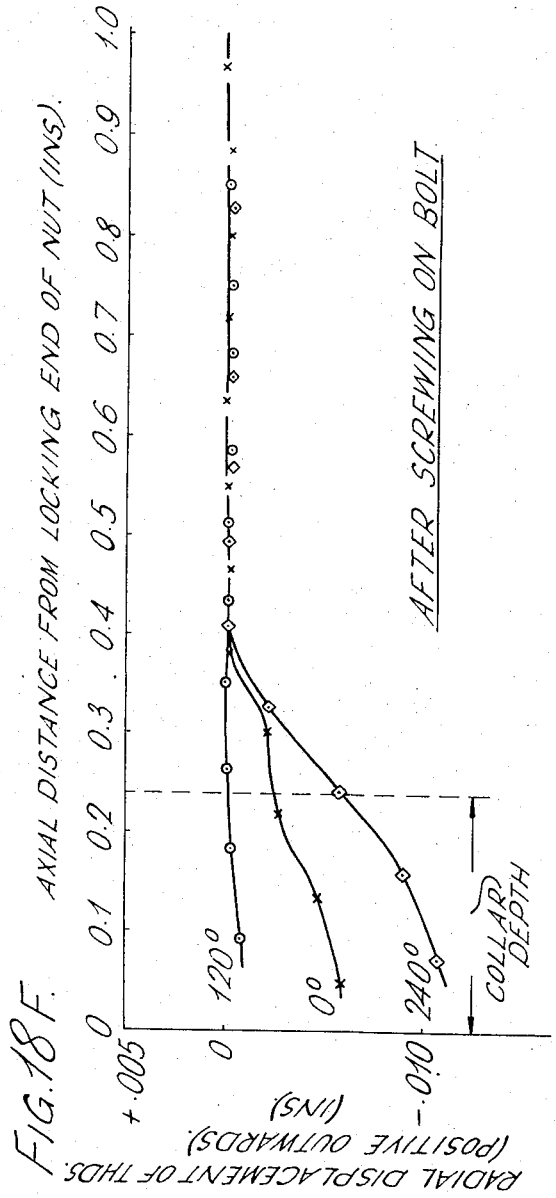

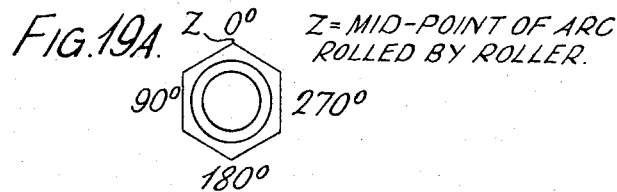
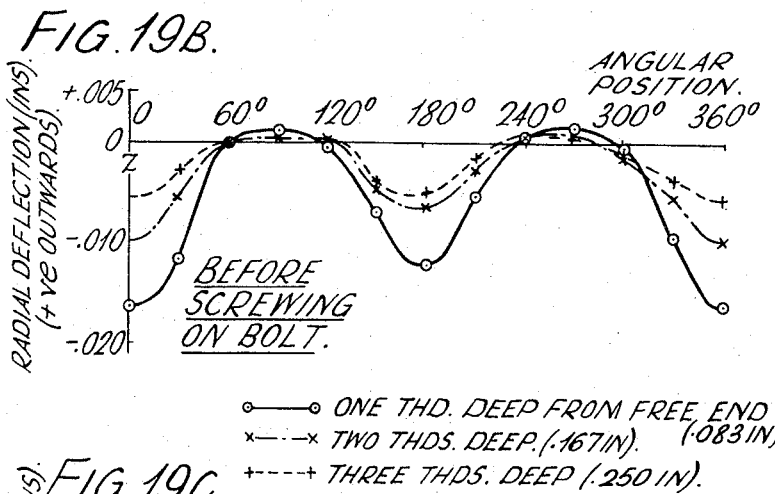
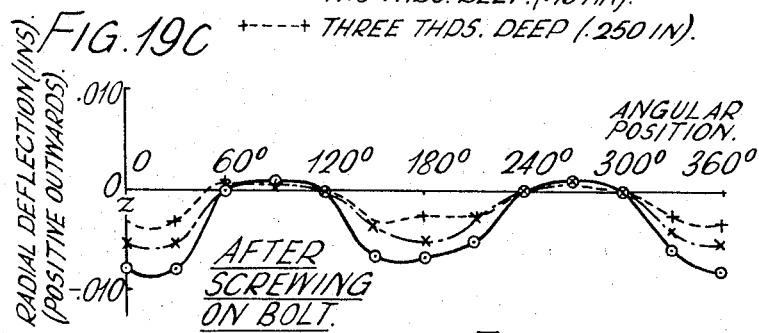
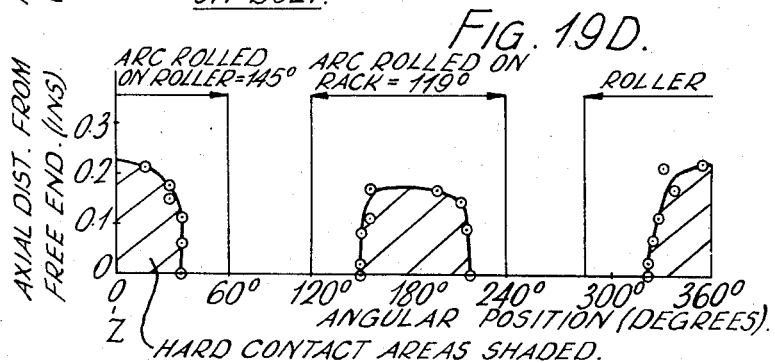

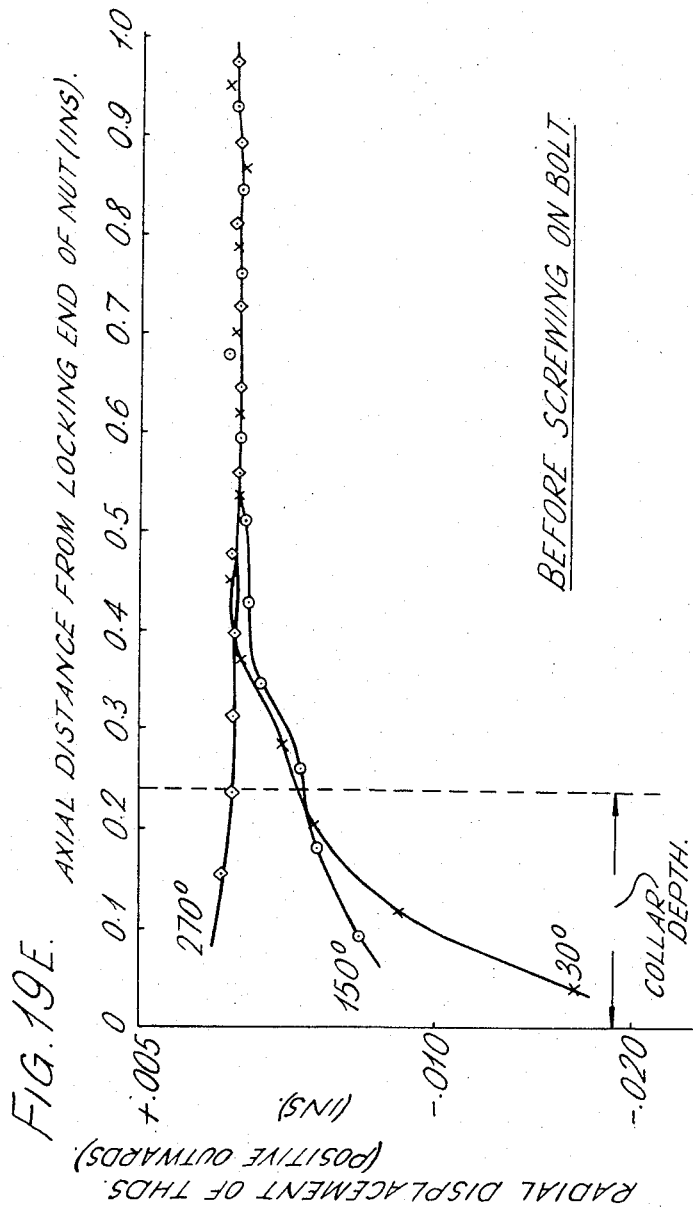

Nov. 28, 1967  J. L. MATTICK  3,354,926
SELF-LOCKING NUT AND METHOD OF MANUFACTURING THE SAME
Filed Jan. 8, 1964  12 Sheets-Sheet 12
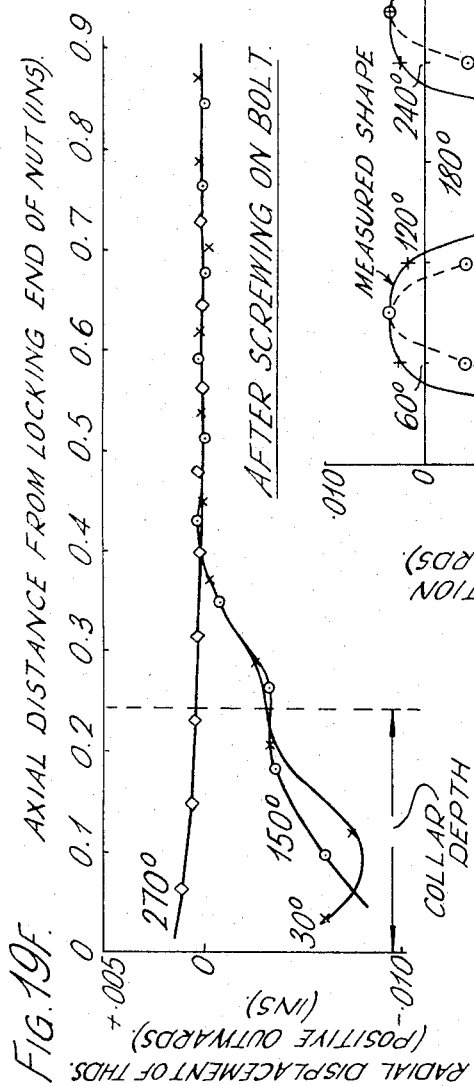
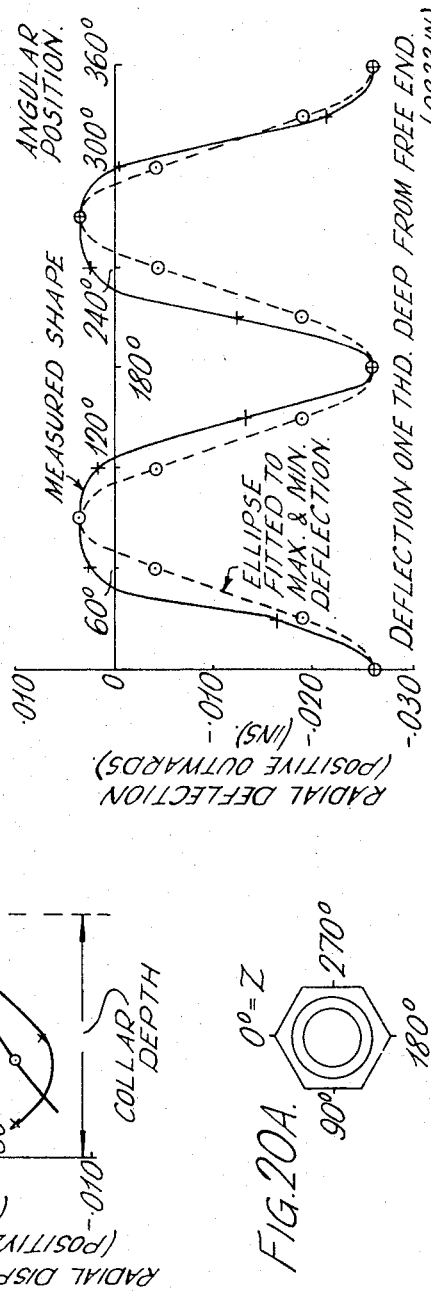
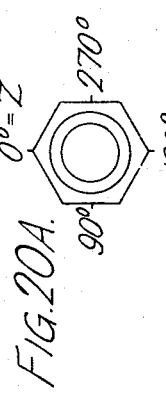
INVENTOR
JAMES LEONARD MATTICK
ATTORNEYS United States Patent Office 3,354,926
Patented Nov. 28, 1967

3,354,926
SELF-LOCKING NUT AND METHOD OF MANUFACTURING THE SAME
James Leonard Mattick, Cardiff, Wales, assignor to Firth Cleveland Fastenings Limited, a company of Great Britain
Filed Jan. 8, 1964, Ser. No. 336,441
Claims priority, application Great Britain, Jan. 11, 1963, 1,455/63
6 Claims. (Cl. 151—21)

The present invention relates to self-locking nuts and methods of manufacturing the same.

According to one aspect, the invention provides a method of manufacturing a one-piece all-metal self-locking nut from a nut blank having a polygonal nut body, an annular collar of reduced cross-section extending directly from the non-bearing end of the nut body and an uninterrupted screw-threaded bore extending axially through the nut blank, which comprises passing the collar of the nut through the nip between two spaced members adapted to provide a frictional grip on the collar, at least one of the members being movable to force the nut through the nip while causing the nut to turn about its axis with a rolling action and the nip or distance between the edges of the members being arranged so that inward deformation of at least a part of the collar takes place as it passes between the members, the nut after such passage being adapted to exert a self-locking action on a co-operating male threaded member by reason of the corresponding inward deformation of the screw threads in the collar of the nut.

In a preferred embodiment, one member comprises a fixed rack with a knurled or roughened edge and the other member comprises a rotatable knurled or roughened roller. Other arrangements include a pair of knurled or roughened rollers, one or both of which is rotatable, and a pair of relatively movable racks with knurled or roughened edges. The invention includes a one-piece all-metal self-locking nut manufactured by any of these methods.

According to yet another aspect, the invention provides a one-piece all-metal self-locking nut having a polygonal nut body, an annular locking collar of reduced cross-section extending directly from the non-bearing end of the nut body without intermediate slots or connecting portions, and a continuous uninterrupted screw-threaded bore extending axially through the nut from the bearing end of the nut body, where the cross-section of the bore is circular, into the locking collar where the cross-section of the bore is distorted from the circular to a substantially oval shape so as to effect progressive locking engagement of the thread of a co-operating male threaded member passing from the bearing end of the nut body towards and into the locking collar.

In order that the invention may be clearly understood, embodiments thereof will now be described by way of example only with reference to the accompanying drawings, in which:

FIGURE 1 is a part elevational/part sectional view of the nut blank;
FIGURE 2 is a plan view corresponding to FIGURE 1;
FIGURE 3 is a part elevational/part sectional view of the finished nut after deformation of the locking collar;
FIGURE 4 is a plan view corresponding to FIGURE 3;
FIGURE 5 is an isometric view of the finished nut;
FIGURE 6 illustrates diagrammatically successive stages in the deformation of the locking collar effected by the first and preferred method of manufacturing the nut;
FIGURE 7 is a diagrammatic elevational view of the nut between the members of FIGURE 6;
FIGURE 8 is a diagrammatic plan view of apparatus used in carrying out an alternative method of manufacturing the nut;
FIGURE 9 is a view corresponding to FIGURE 7 of the nut between the members of FIGURE 8;
FIGURE 10 is a diagrammatic plan view of apparatus used in carrying out a further alternative method of manufacturing the nut;
FIGURE 11 is a section on the line XI—XI of FIGURE 10;
FIGURE 12 is a diagram illustrating calculations relevant to the apparatus of FIGURES 10 and 11;
FIGURE 13 is a side elevation of a practical embodiment of apparatus for carrying out the method of FIGURES 6 and 7;
FIGURE 14 is a plan view of the operative parts of the apparatus, looking down upon the base plate in the direction of the arrow in FIGURE 13;
FIGURE 15 is a section on the line XV—XV of FIGURE 14;
FIGURES 16 and 17 are scrap sections on the lines XVI—XVI and XVII—XVII respectively of FIGURE 14;
FIGURES 18A–F illustrate properties of a particular nut produced by the apparatus of FIGURES 13–17, FIGURE 18A being an explanatory sketch, FIGURES 18B and 18C being graphs of the radial deflection around the collar bore before and after screwing on a bolt respectively, FIGURE 18D showing areas of hard contact with the bolt and the arcs rolled by the roller and rack, and FIGURES 18E and 18F being graphs of the radial deflection at different axial distances before and after screwing on a bolt respectively;
FIGURES 19A–F illustrate properties of another nut produced by the apparatus of FIGURES 13–17, the various figures being similar to FIGURES 18A–F, and
FIGURES 20A–B illustrate properties of yet another nut produced by the same apparatus, being similar to FIGURES 18A–B and 19A–B.

The same reference numerals are used to refer to corresponding parts in the various figures.

Referring now to the drawings, FIGURES 1 and 2 show an all-metal nut blank used in manufacturing the nut of the present invention. The nut blank has a standard hexagonal body 1 and a collar 2 of reduced cross-section relative to the body, the collar 2 extending directly from the non-bearing end 3 of the nut body to the free end 4 of the nut without any intermediate slots or connecting portions. A continuous uninterrupted screw-threaded bore 5 extends axially through the nut blank from the bearing end 6 of the nut body to the free end 4 of the nut and at this stage the cross-section of the bore, disregarding variations caused by the screw-thread, is circular throughout. While the external surface of the annular collar will always be circular in cross-section and is shown as cylindrical, the axial profile need not be straight and may taper, e.g. as shown by the dotted lines 7, so that the collar is frusto-conical, or the profile may for example be curved either convex or concave to the nut axis.

The finished nut is shown in FIGURES 3 to 5, and is produced by deforming the collar 2 of the nut blank so that the collar bore is distorted from the circular to a substantially oval shape. Such deformation, which may be effected by the methods described below, is so arranged that the transition from circular to oval bore is gradual and the nut affords progressive locking engagement of the thread of a co-operating male threaded member or bolt passing from the bearing end 6 of the nut body towards and into the locking collar 2.

In order to effect deformation, the collar of the nut is passed through the nip between two spaced members adapted to provide a frictional grip on the collar, at least one of the members being movable to force the nut through the nip and the distance between the edges of the members being dimensioned to give inward deformation of at least a part of the collar. In the different embodiments of this fundamental method now to be described, the nut always turns about its axis with a rolling action as the collar is forced through the nip, the angle turned through being less than 360°. The frictional grip is provided by knurling or roughening the operative edges of the members, and the methods are illustrated as applied to a cylindrical collar although the modifications necessary to effect deformation of a profiled, e.g. frustoconical or axially curved, collar will be evident to those skilled in the art.

Referring now to FIGURES 6 and 7, the nut blank is fed between a rotatable roller 8 and a straight fixed rack 9. Roller 8 has a knurled upper edge 10 and a lower portion or spacer 11 of reduced diameter, and is arranged to be driven in the direction of the arrow 12 about a fixed axis 13. Rack 9 has a knurled upper edge 14 projecting above a spacer 15.

The members 8 and 9 are so spaced that the hexagonal nut body 1 can pass freely between the spacers 11, 15 while the collar 2 is caught between the knurled edges 10, 14 of the members and subjected to progressive inward deformation as it is forced therebetween.

FIGURE 6 shows three stages in the progressive inward deformation of the nut collar; in stage A, the collar is still cylindrical and is just entering the nip between the roller and the rack. In stage B, the collar has been deformed into a generally oval shape at the point of minimum separation between the rack and the roller, while in stage C the inward deflection has been completed and the finished self-locking nut is emerging from between the members. The self-locking characteristics of the nut are obtained by reason of an inward distortion or deformation of the screw threads in the collar of the nut during inward deflection of the collar, and the distance between the knurled edges 10, 14 of the members is so arranged that the screw-thread deformation is sufficient to give a good self-locking action while allowing the nut to be removed from a co-operating male threaded member for repeated re-use if necessary. The size of the roller may be varied to suit a particular range of collar diameters for nut blanks of various sizes. As further explained below, the shape of the deformed collar bore is generally asymmetrical and the outer surface 16 (FIGURE 5) of the collar is roughened or knurled by contact with the members over the greater part of its periphery in two regions which are also generally asymmetrical.

In a variant of the above method, the nut blank may be passed between a rack 9 which is caused to reciprocate rectilinearly, and a roller 8 which is fixed, i.e. the rack is driven instead of the roller.

In a still further variant of the above method and as shown in FIGURES 8 and 9, nut blanks are passed in succession along a slideway 17 between rollers 18, 19 whose construction is similar to the roller 8 inasmuch as each has a knurled upper edge adapted to engage the collar 2 of the nut blank and a reduced lower portion or spacer 20, 21 which allows the hexagonal body 1 of the nut to pass freely between the rollers. The roller 18 is fixed, while the roller 19 rotates in the direction of the arrow 22 about a fixed axis 23, the nuts being fed along slideway 17 in the direction of the arrow 24.

In a variant of the method shown in FIGURES 8 and 9, the roller 18 may be made rotatable as well as the roller 19. To obtain the same substantially oval deformation, it is necessary carefully to select the relative rotational speeds of the two rollers and/or their relative sizes to suit the nut being processed. If the relative speeds of the rollers are arranged to be variable at will, a given pair of rollers can be used to deflect the collars of nut blanks over a range of sizes.

It is also possible to use a pair of relatively movable racks in a process similar to thread rolling, providing at least one of the racks has an appropriately shaped contour at its deforming edge. An apparatus suitable for use in this method is shown in FIGURES 10 and 11, where a straight rack 25 having a knurled edge 26 is illustrated as fixed and a further rack 27 having a profiled edge 28, also knurled, is illustrated as reciprocally movable in the forward direction of the arrow 29 parallel to the rack 25 and back to the rest position shown. Racks 25, 27 are mounted on backing plates 30, 31 having recesses 32, 33 (FIGURE 11) to accommodate the hexagonal nut body, and the fixed backing plate 30 is recessed to form a vertically disposed nut chute 34 down which the nut blanks are fed in the direction of the arrow 35. A reciprocable feed slide 36 urges each nut blank from the bottom of the chute 34 in the direction of the arrow 37 to the space between the racks 25, 27.

It is important in all variants of the method that the arcs of contact between the members and the collar should extend over most of the collar periphery, so as to avoid localised deformation; at the same time, the arcs of contact should not overlap since this would tend to reduce the inward deformation previously produced. Again, it is found in practice that the extent of outward deformation is very small and can to a first approximation be neglected in calculations on the best dimensions of the deforming members to use for given nut sizes in the different methods. While such calculations are subject to error due to deflections of the deforming apparatus under load, they are useful to give approximate relationships between the various parameters in each method and these relationships can later be corrected using test results on a particular apparatus or machine. In the case of the fixed rack-rotating roller method of FIGURES 6 and 7, for example, it is possible to deduce a relationship between the initial radius $r$ of the nut collar, the difference $d$ between the nut collar diameter and the minimum roller-rack separation (i.e. theoretical extent of squeeze), and the radius $R$ of the roller. Similar calculations can be employed to give an indication of the desirable ratio of the angular velocities of the rollers used in the method employing two rotating rollers. As an illustration, there is given below a calculation to determine the appropriate profile of the edge of a rack in the two-rack process of FIGURES 10 and 11. In this analysis the fixed rack is assumed to be profiled and the moving rack is assumed to be straight, but this situation could of course be reversed without affecting the result.

Referring now to FIGURE 12, if the nut rolls without slipping on both racks it can be imagined that a piece of string, wound round the nut and fastened to the two racks at A and B, would roll the nut through the gap. Another piece of string from F to G could also be imagined, to prevent the nut from slipping out once the midpoint has been passed.

Since it is known that the radial spread of the finished nut on the maximum width of the oval is very small, it will be assumed that the nut leaving the racks will have the same diameter as at entry.

The rack profile will be in the form of a circular arc to give the same relationship between amount of squeeze and position of the nut as in the roller and rack arrangement As the nut rolls through the gap, the long arc ST of the nut collar, $(\pi+\alpha)$, will roll on the flat rack from S to H, so that $$SH = r(\pi + \alpha) \qquad (1)$$

but $$SH = XY = 2(R+r) \sin \alpha$$

At the same time, the short arc ST of the collar, $(\pi-\alpha)$, will roll on the profiled rack from T to E, so that $$ET = r(\pi - \alpha) \qquad (2)$$

but $$ET = 2\alpha R$$

The angle $\alpha$ must be determined from the amount of squeeze $d$.

$$\sin \alpha = \frac{DT}{CT} = \frac{DT}{R}, \text{ and } DT = [(2R-x)x]^{1/2} \text{ where } x = \frac{d \cdot R}{(R+r)}$$

giving $\sin \alpha = \frac{1}{(R+r)}[d(2R+2r-d)]^{1/2}$  (3)

Equation 1 becomes $$2[d(2R+2r-d)]^{1/2} = r(\pi+\alpha) \quad (1)$$

Equation 2 becomes $$2\alpha R = r(\pi-\alpha) \quad (2)$$

where $\alpha$ is given in Equation 3.

The solution of these equations can give the diameter of the rack profile if $d$ is known.

The process can be arranged to give no overlap if say (2) and (3) are solved and the values of R and $\alpha$ are then substituted in (1). Since Equation 1 relates the long arc ST of the nut collar to the distance rolled on the flat rack (SH), it will be possible to determine whether overlap of the knurling occurs. If it does, i.e. if the left hand side of (1) is smaller than the arc ST, which makes up the right hand side, it is necessary to solve Equations 1 and 3 to give the solution.

The Equations 1, 2 and 3 are identical with those derived for the roller and rack process assuming the same diameter of nut at entry and outlet from the narrowed portion. It can therefore be stated that the profile of rack for a given size of nut should be identical with that of the roller used in the roller-rack process for the same nut.

This avoids the obvious difficulty of assuming a value for $d$, since it is known from photographs that the minimum width of a finished nut is greater than the minimum width observed during deformation due to the elasticity of the material making up the nut.

The product should be virtually identical if the profiled rack is a circular arc having a radius equal to that of the roller used in the alternative roller and rack process, and the initial gap setting is also the same.

A practical embodiment of apparatus for carrying out the roller and rack method of FIGURES 6 and 7 is shown in FIGURES 13 to 17. The operative parts of the machine are supported on a base plate 38 which is itself mounted, as shown in FIGURE 13, at a substantial angle to the horizontal by means of a frame 39. These operative parts include a rotary-type hopper 40 for nut blanks, a straight knurled rack 9 arranged to be fixed in a predetermined position, an automatically rotatable roller 8 with a knurled edge spaced from the rack, and a chute 41 arranged to feed nut blanks successively from the hopper 40 into the nip between the rack 9 and the roller 8.

Hopper 40 is secured to shaft 42 arranged for rotation in the direction of arrow 43 (FIGURE 14) so that nut blanks are urged against the wall 44 of the hopper in the region of a part-circular nut guide 45 spaced from the wall 44 a distance sufficient to allow a nut blank to pass between guide 45 and wall 44 and fall by gravity down chute 41. A hopper guide or barrier 46 is situated close to wall 44 on the opposite side of chute 41 and extends to a nut well 47 at the top end of the hopper for any nuts which may have been carried by hopper wall 44 up the side of the hopper behind nut guide 45. Chute 41 has adjustable sides 48, 49 mounted on base plate 38, and a top cover 50 (FIGURES 14 and 16) to prevent the nut blank from toppling over as it descends the chute. At its lower end, side 48 of the chute has a laterally extending finger 51 spaced above the surface of a plate 52 which rotates with roller 8 so that a nut blank reaching the end of the chute 41 and lodging against finger 51 is displaced towards a retaining spring 53 by rotation of plate 52 and abutment of pins 54 carried by the plate, these pins 54 being sufficiently short to pass underneath finger 51. Retaining spring 53, which is secured at one end to side 49 of the chute, directs the nut blank downwards so that the collar enters the nip between roller 8 and rack 9 and the finished nut is funnelled out of the machine between guides 55 and 56. An adjustable nut stripper 57 ensures that no nut blanks can escape from chute 41 and plate 52 without first passing between the rack and roller.

Rack 9 is held in position and spaced from the surface of plate 52 by spacer block 15, which is adjustable between fixed guides 58 by means of rearwardly abutting adjustment screws 59 and locking screws 60 extending into base plate 38 through slots in the block. Roller 8 is keyed together with spacer 11 (FIGURE 15) to roller shaft 61 arranged to be driven by motor 62 through spider coupling 63, gearbox 64 and coupling 65. Roller shaft 61 is journalled at 66 in base plate 38 in parallel relation to hopper shaft 42 journalled at 67 in the same base plate, hopper shaft 42 being driven from roller shaft 61 by a drive belt 68 extending round pulleys 69, 70 keyed to the roller shaft and hopper shaft respectively and a jockey roller 71 on jockey shaft 72 secured to the base plate.

As shown in FIGURES 15 and 17, the wall 44 of hopper 40 is provided with an interior liner 73. The lower part of wall 44 is castellated to provide a series of substantially rectangular openings 74 sufficiently large to allow a nut blank to pass through them. The lower edge of liner 73, which is spaced from base plate 38 a distance slightly greater than the height of the nut body, is also castellated to provide substantially rectangular openings 75 but these openings are of such a size that only the nut collar and not the nut body can traverse them. The openings in the hopper wall and liner are in register, and the effect is to allow nut blanks to be released into the space between the wall 44 and nut guide 45 (to which is secured a top cover 76, again to prevent toppling of the nut) only when the blanks are correctly orientated with the collar above the nut body.

TABLE 1

| Size and Thread | Pitch, in. | Thread Major Dia., in. | Across Flats Dimension (max.), in. | Collar Diameter, in. | Collar Thickness (min.), in. | Collar Depth, in. | Deflection (max.), in. | Ratio Collar Dia./Across Flats | Roller Dia., in. |
|---|---|---|---|---|---|---|---|---|---|
| No. 6—40 UNC | 0.0250 | .1380 | .3125 | .235/.240 | .0485 | .055/.065 | .019 | .768 | 1 |
| No. 8—32 UNC | 0.0313 | .1640 | .3440 | .285/.290 | .0605 | .070/.080 | .019 | .843 | 1 |
| No. 10—32 UNF | 0.0313 | .1900 | .3750 | .335/.340 | .0725 | .070/.080 | .019 | .907 | 1½ |
| ¼″—28 UNF | 0.0357 | .2500 | .4375 | .390/.395 | .0700 | .080/.090 | .020 | .903 | 2 |
| ⁵⁄₁₆″—24 UNF | 0.0417 | .3125 | .5000 | .455/.460 | .0700 | .095/.105 | .024 | .920 | 2 |
| ⅜″—24 UNF | 0.0417 | .3750 | .5625 | .515/.520 | .0700 | .095/.105 | .024 | .924 | 2½ |
| ⁷⁄₁₆″—20 UNF | 0.0500 | .4375 | .6875 | .640/.645 | .1000 | .110/.120 | .028 | .938 | 3½ |
| ½″—20 UNF | 0.0500 | .5000 | .7500 | .690/.695 | .095 | .110/.120 | .028 | .927 | 3½ |
| ⁹⁄₁₆″—18 UNF | 0.0556 | .5625 | .8750 | .775/.780 | .105 | .130/.150 | .031 | .891 | 5 |
| ⅝″—18 UNF | 0.0556 | .6250 | .9375 | .835/.840 | .105 | .130/.150 | .031 | .896 | 5 |
| ¾″—16 UNF | 0.0625 | .7500 | 1.1250 | 1.000/1.005 | .125 | .145/.165 | .034 | .893 | 5 |
| ⅞″—14 UNF | 0.0714 | .8750 | 1.3125 | 1.125/1.130 | .125 | .170/.190 | .038 | .861 | 6½ |
| 1″—12 UNF | 0.0833 | 1.000 | 1.5000 | 1.290/1.295 | .145 | .200/.220 | .044 | .863 | 6½ |
| 1⅛″—12 UNF | 0.0833 | 1.125 | 1.6875 | 1.440/1.450 | .158 | .220/.240 | .044 | .859 | 7½ |
| 1¼″—12 UNF | 0.0833 | 1.250 | 1.8750 | 1.580/1.590 | .165 | .235/.245 | .044 | .848 | 7½ |

By way of illustration, Table 1 lists the various dimensions of nuts which have been produced by the apparatus of FIGURES 13 to 17 within the range No. 6 UNC to 1¼" UNF inclusive, together with the diameter and wall thickness of the undeformed collar, the maximum allowable inward deformation or deflection, and the diameter of the roller found appropriate for effecting deformation in the case of each nut. For the UNF threads, the maximum inward radial displacement was substantially equal to the difference between the maximum nut minor diameter and the minimum minor diameter of a bolt designed to fit within the nut (Class 2B fit). The wall thickness of the undeformed collar, neglecting thread thickness, was originally designed to equal two thread pitches; variations were made to facilitate production, but the wall thickness was never allowed to fall below 1½ thread pitches.

Detailed measurements were performed on two nuts of identical size (1¼" UNF) produced by the apparatus of FIGURES 13 to 17. In the case of the nut shown diagrammatically in FIGURE 18A, the nut collar was squeezed or deformed to the maximum allowable extent and the circumferential position of greatest squeeze was arranged to occur opposite the flats of the hexagonal nut body. In the case of the nut of FIGURE 19A, a minimum degree of squeeze was imparted to the nut collar and the position of greatest deformation was arranged to occur opposite the corners of the nut body. Measurements of the deformation of the interior of the collar bore from its initial circular cross-section were made both before and after the nut had been screwed onto a co-operating bolt, with the aid of a small sphere placed between adjacent screw-threads. The resulting variations in the deformation around the periphery of the bore are shown in FIGURES 18B and 18C for the nut of FIGURE 18A and in FIGURES 19B and 19C for the nut of FIGURE 19A. Axial variations in the deformation are plotted in FIGURES 18E and 18F for the first nut and in FIGURES 19E and 19F for the second nut. It will be appreciated that the graphs are drawn to a scale such that the radial deflection is greatly exaggerated with reference to variations in either angular or axial position. This is done for the sake of clarity, but the exaggeration should be borne in mind since the peak inward deflection illustrated at 210° in FIGURE 18B, for example, in fact occurs very gradually and it is indeed a feature of the nut of the present invention that the screw thread of the collar bore has no abrupt points of inflection such as would cause galling of the thread of a male threaded member; in addition, the external periphery of the locking collar follows a profile which, neglecting knurling or alternative friction marks made by contact with the deforming members during production, is without discontinuities of curvature.

In addition to the above measurements, an approximate evaluation of the locking contact area within the nut bore was made in each case by measuring the limits of the region of shine left on the threads in the bore after the nut had been removed from a bolt. These "hard contact areas" are shown in FIGURES 18D and 19D and here again, it will be understood that the areas of effective frictional contact will not necessarily be limited to the regions exhibiting a clear and distinct surface polish. One of the principal reasons for the efficiency of the nut is that the rolling action of the collar between the deforming members during production gives rise to a shape of the deformed bore having large areas of locking contact in the vicinity of the collar.

FIGURES 18D and 19D also show the arcs rolled by contact with the rack and roller and it will be seen that the total contact is always more than 180°, i.e. deforming contact is always made with the collar over the greater part of its periphery.

The cross-sectional shape of the bore in the locking collar is an asymmetrical oval. In each case the maximum radial deflection corresponds with the roller side of the nut collar probably due to the fact that the roller always rolls over a larger arc than the rack and also because of the larger curvature of the roller in comparison with the flat rack. An exception to the generally asymmetrical form was observed in the case of a third nut of the same size, shown diagrammatically in FIGURE 20A. As in the case of the nut shown in FIGURE 18A, the collar was given the maximum squeeze but in this instance the circumferential position of greatest deformation occurred opposite the corners of the nut body. The circumferential variation in radial deflection at an axial position one thread deep from the free end (.0833 in.) is shown in the full line of FIGURE 20B and for the sake of comparison the corresponding curve for an elliptical deformation having the same extreme values is shown in dotted line. The symmetrical deformation of this particular nut may be due to any one of a number of factors: for example, the thread may not have been concentric with the collar and the position of the nut in the manufacturing process may have been such as to cancel out the asymmetrical deformation normally characteristic of the nut.

The maximum inward radial displacement of the locking portion of the bore is always greatly in excess of the maximum outward displacement, and it makes little or no difference whether deformation is effected in a direction across the corners or perpendicular to the flats of the nut body. The axial depth of the locking collar should be equivalent to at least 1½ thread pitches, and is usually equivalent to two thread pitches except for coarse threads. It will be seen from the graphs that the thread of the nut bore is gradually deflected without abrupt change as the bore cross-section passes axially from circular to substantially oval in shape; no sudden change is observed in the bore shape at the lower end of the locking collar, deflection actually commencing within the nut body at a distance from the free end of the nut which for the particular nuts tested was of the order of 1.6× the collar depth. Near the free end itself the threads may sometimes be deformed axially during initial screwing onto a bolt, since the metal in this region has less axial restraint than radial restraint. To assist in screwing the nut onto a bolt and to facilitate its removal and repeated re-use, the nut threads should be coated with lubricant in known manner.

It will be seen from FIGURES 18 and 19 that the inward collar deformation of the unused or virgin nut is greatly in excess of the deformation measured after the nut has been screwed on a bolt. The deformation after use is approximately the same irrespective of the extent of deformation (within allowable limits) of the virgin nut. This means that, providing the locking collar is designed correctly, relatively wide manufacturing tolerances in the deforming process are permissible. The primary design parameter in this connection is the radial thickness of the collar. It is therefore an important feature of the nut of the present invention that, where distortion of the collar bore is caused by deforming the collar from an initially cylindrical shape, the radial thickness of the collar prior to deformation should be so chosen that the deformed collar is thin enough to undergo plastic deformation when first applied to a co-operating male threaded member but thick enough to provide a resilient locking action during a large number of subsequent applications to such a member. It has been found that the thickness of the undeformed collar will have the correct value if the external diameter A of the cylindrical collar prior to deformation is related to the major diameter D of the thread in the nut body by the formula $A = (CD + K) \pm t$. C and K are parameters dependent upon the size range of the nut and $t$ represents tolerance, C, K and $t$ having the following values for the specified size ranges:

3–7 mm. inclusive (metric): $C = 1.36$, $K = 0.040''$, $t = \pm 0.010''$

8–30 mm. inclusive (metric): $C = 1.192$, $K = 0.110''$, $t = \pm 0.040''$

¾₁₆″–⅞₁₆″ inclusive (BSF and BSW): $C=1.33$, $K=0.050″$, $t=\pm 0.010″$

½″–1¼″ inclusive (BSF and BSW): $C=1.175$, $K=0.120″$, $t=\pm 0.040″$

⁹⁄₁₆″–1¼″ inclusive (Unified): $C=1.130$, $K=0.150″$, $t=\pm 0.040″$

The nut of the present invention has been found to have excellent locking properties which are retained during repeated re-use. The nut blanks may readily be manufactured by modern methods of production such as cold forming, and the extreme simplicity of the deforming process means that the nuts can be produced both rapidly and economically. There are no slots or connecting portions between nut body and collar which would be liable to give rise to corrosion and localized cracking, and axial strength is in no way sacrificed. The locking collar of the nut is not subjected to abrupt distortion: the asymmetrical oval form, developed by the above-mentioned methods, involves a progressive deflection of the nut thread without pitch distortion or resistance to smooth thread travel. At the same time, consistent torque performance is obtained with excellent reproducibility. The fact that there is no abrupt distortion of the locking collar makes it possible to avoid, even when ultra high speed nut runners are employed, the galling and eventual seizure on mating bolts which is experienced with prior art all-metal nuts.

It will be understood that the frictional grip between the spaced members and the nut collar may also be provided by serrating or roughening the collar periphery of the nut blank, and in this case it may be unnecessary to roughen the edges of the members themselves.

I claim:

1. An apparatus for the manufacture of a one-piece all metal self-locking nut from a nut blank having a polygonal nut body, an annular collar of reduced cross section extending directly from the non-bearing end of the nut body and an uninterrupted screw-threaded bore extending axially through the nut body and collar, the apparatus comprising a knurled rack and a knurled roller spaced from said rack with said rack and roller forming a nip therebetween of constant spacing, a hopper for nut blanks, a chute for feeding nut blanks successively from said hopper into said nip, means for rotating said roller, means for holding said rack in fixed position whereby the collar portion of a nut blank fed to said nip by said chute is forced through said nip with a rolling action of the nut blank about its axis such that at least part of the collar is deformed inwardly as the nut blank passes through the nip, and means associated with the hopper to release a nut blank to the chute only when the nut blank is correctly oriented with the collar above the nut body.

2. A method of manufacturing a one-piece all metal self-locking nut made from a nut blank having a polygonal nut body, an annular collar of reduced cross section extending directly from the non-bearing end of the nut body and an uninterrupted screw threaded bore extending axially through the nut blank; said method comprising passing the collar of the nut blank along a plane of travel perpendicular to the nut axis into a nip constituted by opposed nut blank engaging surfaces of two spaced members where said surfaces continuously vary in separation along the plane of travel of the nut to converge towards an area of minimum nip spacing and to diverge away from said area with at least one of said surfaces being curved in said plane, and maintaining said minimum nip spacing substantially constant while moving at least one of said members so that the members frictionally grip the collar to force the nut through the nip while simultaneously causing the nut to turn about its axis with a rolling action of less than 360° such that as the collar passes with the said rolling action between the members, said surfaces engage and inwardly deform areas of the collar lying substantially opposite each other in said plane where said deform areas together extend over less than the complete collar circumference.

3. A one-piece all metal self-locking nut made from a nut blank having a polygonal nut body, an annular collar of reduced cross section extending directly from the non-bearing end of the nut body and an uninterrupted screw threaded bore extending axially through the nut blank; said nut being formed by the process which comprises passing the collar of the nut blank along a plane of travel perpendicular to the nut axis into a nip constituted by opposed nut blank engaging surfaces of two spaced members where said surfaces continuously vary in separation along the plane of travel of the nut to converge towards an area of minimum nip spacing and to diverge away from said area with at least one of said surfaces being curved in said plane and both said surfaces being rough, and maintaining said minimum nip spacing substantially constant while moving at least one of said members so that the members frictionally grip the collar to force the nut through the nip while simultaneously causing the nut to turn about its axis with a rolling action of less than 360° such that as the collar passes with the said rolling action between the members, said rough surfaces engage and inwardly deform areas of the collar lying substantially opposite each other in said plane where said deform areas together extend over less than the complete collar circumference, and markings being impressed into said collar by said surfaces in portions extending over less than the complete collar circumference with the markings at the circumferential end of a portion being lightly impressed into said collar and progressively increasing in depth toward the center of the portion and wherein the threads in said collar and in a part of said nut body are deformed radially inwardly of said bore.

4. A method according to claim 2 wherein the step of passing the collar through the nip between two spaced members comprises passing the collar through the nip between a rack and a roller.

5. A method according to claim 4 wherein the step of moving at least one member comprises rotating the roller while the rack is held fixed.

6. An apparatus for the manufacture of a one-piece all metal self-locking nut from a nut blank having a polygonal nut body, an annular collar of reduced cross section extending directly from the non-bearing end of the nut body and an uninterrupted screw threaded bore extending axially through the nut body and collar, the apparatus comprising a straight knurled rack and a knurled roller spaced from said rack with said rack and roller forming a nip therebetween of constant spacing, a hopper for nut blanks, a chute for feeding nut blanks successively from said hopper into said nip, means for rotating said roller, means for holding said rack in fixed position, and having the diameter of said roller no greater than seven times the diameter of said annular collar whereby when the collar portion of a nut blank is fed to said nip by said chute, the collar portion is forced through said nip with a rolling action of the nut blank about its axis of less than 360° such that at least part of the collar is deformed inwardly as the nut blank passes through the nip.

References Cited

UNITED STATES PATENTS

| | | | |
|---|---|---|---|
| 332,540 | 12/1885 | Law | 15—21 |
| 2,255,286 | 9/1941 | Harvey | 151—21 |
| 2,418,070 | 3/1947 | Green | 10—86 |
| 2,464,412 | 3/1949 | Neff | 10—86 |
| 2,464,410 | 3/1949 | Neff | 10—72 |
| 2,464,729 | 3/1949 | Stover | 10—72 |
| 2,445,696 | 7/1948 | Rudd | 151—21 |
| 2,923,339 | 2/1960 | Skidmore | 151—21 |

FOREIGN PATENTS 914,475   1/1963   Great Britain.

ANDREW R. JUHASZ, *Primary Examiner.*